(12) United States Patent
Kondo

(10) Patent No.: US 9,191,607 B2
(45) Date of Patent: Nov. 17, 2015

(54) INFORMATION DISPLAY DEVICE, INFORMATION DISPLAY METHOD, AND INFORMATION DISPLAY SYSTEM

(71) Applicant: PANASONIC CORPORATION, Osaka (JP)

(72) Inventor: Mitsufusa Kondo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/296,989

(22) Filed: Jun. 5, 2014

(65) Prior Publication Data

US 2014/0285716 A1    Sep. 25, 2014

Related U.S. Application Data

(63) Continuation of application No. PCT/JP2012/005753, filed on Sep. 11, 2012.

(30) Foreign Application Priority Data

Dec. 15, 2011   (JP) ................................. 2011-274177

(51) Int. Cl.
*H04N 5/445*      (2011.01)
*H04N 5/455*      (2006.01)
(Continued)

(52) U.S. Cl.
CPC ......... *H04N 5/445* (2013.01); *H04N 21/41407* (2013.01); *H04N 21/4725* (2013.01);
(Continued)

(58) Field of Classification Search
CPC ............ H04N 21/41407; H04N 5/445; H04N 21/4725; H04N 21/84; H04N 21/6181; H04N 21/8133; H04N 21/6131
See application file for complete search history.

(56) References Cited

U.S. PATENT DOCUMENTS 6,407,776 B1 *   6/2002   Sekimoto et al. ............. 348/553
7,712,123 B2     5/2010   Miyaoku et al.
(Continued)

FOREIGN PATENT DOCUMENTS

JP    11-069317 A    3/1999
JP    11-353325 A    12/1999
(Continued)

OTHER PUBLICATIONS

International Search Report issued in PCT/JP2012/005753, dated Oct. 23, 2012, with English translation.

*Primary Examiner* — Jefferey Harold
*Assistant Examiner* — Sean Haiem
(74) *Attorney, Agent, or Firm* — McDermott Will & Emery LLP

(57) ABSTRACT

An information display device, which facilitates obtainment of information about an object in video, includes: a related information obtaining unit which obtains related information including (i) positional information indicating a first position of a currently displayed object on a video display screen of a video display device that is external to the information display device and (ii) object information indicating attribute information of the object; a display unit which displays the object information in the related information obtained by the related information obtaining unit; and a display control unit which controls the display unit so that the object information is displayed at a second position on the display unit corresponding to the first position indicated by the positional information in the related information, in coordination with a display of the object on the video display screen.

16 Claims, 13 Drawing Sheets

(51) Int. Cl.
*H04N 5/44* (2011.01)
*G06K 9/36* (2006.01)
*H04N 21/414* (2011.01)
*H04N 21/4725* (2011.01)
*H04N 21/61* (2011.01)
*H04N 21/81* (2011.01)
*H04N 21/84* (2011.01)

(52) U.S. Cl.
CPC ....... *H04N21/6131* (2013.01); *H04N 21/6181* (2013.01); *H04N 21/8133* (2013.01); *H04N 21/84* (2013.01)

(56) References Cited

U.S. PATENT DOCUMENTS

| | | | | |
|---|---|---|---|---|
| 2003/0051252 | A1* | 3/2003 | Miyaoku et al. | 725/109 |
| 2003/0229900 | A1* | 12/2003 | Reisman | 725/87 |
| 2005/0200759 | A1* | 9/2005 | Hasegawa | 348/564 |
| 2009/0073322 | A1* | 3/2009 | Shibahara et al. | 348/726 |
| 2011/0243474 | A1* | 10/2011 | Ito | 382/286 |
| 2012/0128241 | A1* | 5/2012 | Jung | 382/165 |

FOREIGN PATENT DOCUMENTS

| | | |
|---|---|---|
| JP | 2002-209204 A | 7/2002 |
| JP | 2005-159743 A | 6/2005 |
| JP | 2005-260379 A | 9/2005 |
| JP | 2005-295136 A | 10/2005 |
| JP | 2009-071704 A | 4/2009 |
| JP | 2010-087773 A | 4/2010 |
| JP | 2011-234343 A | 11/2011 |
| WO | 01-80553 A1 | 10/2001 |

* cited by examiner

| Display region | Currently displayed related information | Display list |
|---|---|---|
| Top-left | | |
| Top-right | | |
| Bottom-left | | |
| Bottom-right | | |

| Display region | Currently displayed related information | Display list |
|---|---|---|
| Top-left | | |
| Top-right | | |
| Bottom-left | A | A |
| Bottom-right | | |

(b)

| Display region | Currently displayed related information | Display list |
|---|---|---|
| Top-left | | |
| Top-right | | |
| Bottom-left | | A |
| Bottom-right | | |

(c)

| Display region | Currently displayed related information | Display list |
|---|---|---|
| Top-left | | |
| Top-right | | |
| Bottom-left | B | A, B |
| Bottom-right | | |

| ID | |
|---|---|
| Display position 1 | |
| Display period 1 | Start time | |
| | End time | |
| Display position 2 | |
| Display period 2 | Start time | |
| | End time | |
| Display information | Title | |
| | Detailed information | |
| | Representative image | |

INFORMATION DISPLAY DEVICE, INFORMATION DISPLAY METHOD, AND INFORMATION DISPLAY SYSTEM

CROSS REFERENCE TO RELATED APPLICATIONS

This is a continuation application of PCT International Application No. PCT/JP2012/005753 filed on Sep. 11, 2012, designating the United States of America, which is based on and claims priority of Japanese Patent Application No. 2011-274177 filed on Dec. 15, 2011. The entire disclosures of the above-identified applications, including the specifications, drawings and claims are incorporated herein by reference in their entirety.

FIELD

The present disclosure relates to an information display device, an information display method, and an information display system.

BACKGROUND

Along with widespread use of mobile terminals, more and more viewers carry mobile terminals on a daily basis. In view of this, there is possible new usage of such mobile terminals. An example is the case where a viewer views video, such as a television (TV) program, on TV, while carrying a mobile terminal. The viewer uses the viewer's mobile terminal to search a network for more detailed information about an object appearing in video of a video program, such as a TV program, on TV, and obtain and view the information. Accordingly, the viewer is capable of viewing information about the currently viewed video program more instantaneously.

For example, Japanese Unexamined Patent Application Publication No. 2002-209204 (hereinafter referred to as PTL 1) discloses a technique for displaying, in video broadcast or the like, video as well as related information about the video. In this technique, video and its related information in video broadcast or the like are transmitted to a viewing device. A viewer selects an object of interest on the display screen of the viewing device. The viewing device identifies related information about the selected object from among plural related information items, based on the position of the selected object on the display screen, and displays the identified information about the object.

SUMMARY

The present disclosure provides an information display device which facilitates obtainment of information about an object in video.

An information display device according to the present disclosure includes: a related information obtaining unit which obtains related information including (i) positional information indicating a first position of an object on a video display screen of a video display device and (ii) object information indicating attribute information of the object, the object being currently displayed on the video display screen, the video display device being external to the information display device; a display unit which displays the object information included in the related information obtained by the related information obtaining unit; and a display control unit which controls the display unit so that the object information is displayed at a second position on the display unit in coordination with a display of the object on the video display screen, the second position corresponding to the first position indicated by the positional information included in the related information.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 11 is a diagram for illustrating update of the display management table.

DESCRIPTION OF EMBODIMENTS

Figure 1:
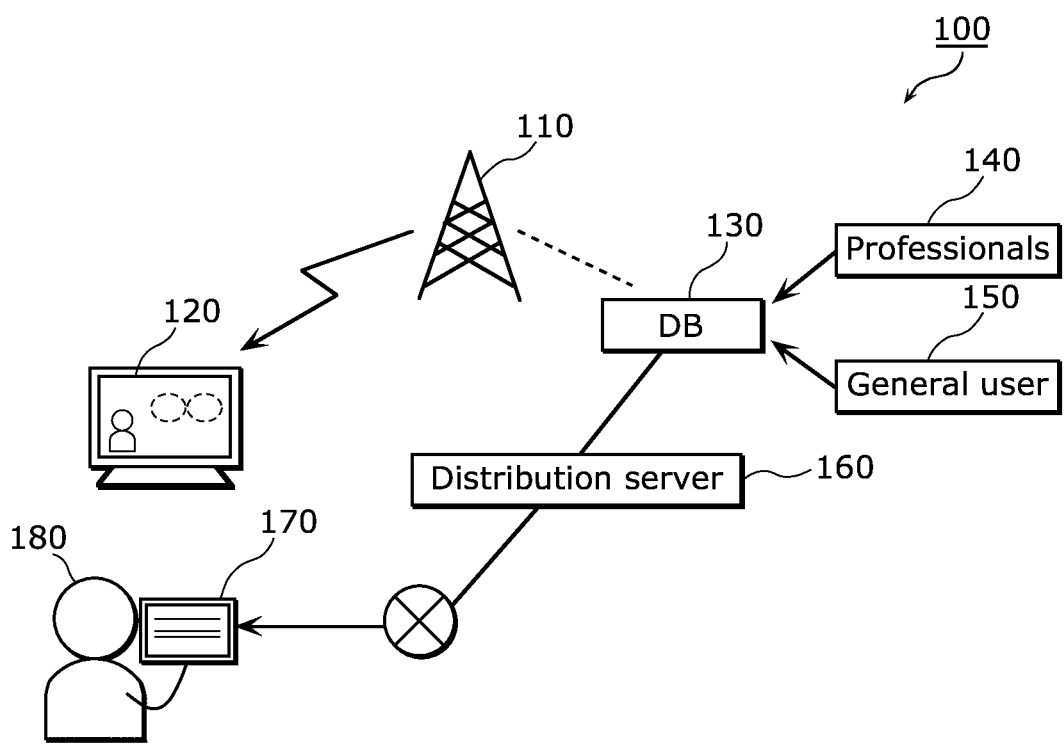
FIG. 1 illustrates an example of a configuration of an information display system according to Embodiment 1.

Hereinafter, non-limiting embodiments will be described in detail with reference to the accompanying drawings. Unnecessarily detailed description may be omitted. For example, detailed descriptions of well-known matters or descriptions previously set forth with respect to structural elements that are substantially the same may be omitted. This is to avoid unnecessary redundancy in the descriptions below and to facilitate understanding by those skilled in the art.

It should be noted that the inventor provides the accompanying drawings and the description below for a thorough understanding of the present disclosure by those skilled in the art, and the accompanying drawings and the descriptions are not intended to be limiting the subject matter recited in the claims appended hereto.

First, a problem to be solved by the present disclosure will be described in detail.

With use of the technique disclosed in PTL1, a viewer is capable of viewing information about an object of interest in video of a video program by selecting the object. However, in the technique disclosed in PTL1, video and its related information are displayed on the same device. Hence, the viewer has to view the video and its related information on the same display screen.

On the other hand, in the case where a video display device which displays a video program is different from an information display device which displays information, a viewer needs to view both screens of the video display device and the information display device. In such a case, when plural information items are displayed on the information display device at the same time, the viewer needs to find the information that the viewer wants from among the plural information items. This requires the viewer to view the respective screens of the video display device and the information display device, and to quickly look for specific information from among plural information items displayed on the display screen of the information display device. This is likely to impose a heavy burden on the viewer who wants to view the video on the video display device.

An object of the present invention is to provide an information display device which facilitates obtainment of information about an object in video.

In order to achieve the object, an information display device according to the present disclosure includes: a related information obtaining unit which obtains related information including (i) positional information indicating a first position of an object on a video display screen of a video display device and (ii) object information indicating attribute information of the object, the object being currently displayed on the video display screen, the video display device being external to the information display device; a display unit which displays the object information included in the related information obtained by the related information obtaining unit; and a display control unit which controls the display unit so that the object information is displayed at a second position on the display unit in coordination with a display of the object on the video display screen, the second position corresponding to the first position indicated by the positional information included in the related information.

With this, a viewer of video is capable of obtaining, from the information display device, related information about an object currently displayed on the video display screen of the video display device. The position of the related information displayed on the display unit (display screen) corresponds to the position of the object on the video display screen. Hence, the viewer is capable of finding related information of the object easily by viewing the position, on the display unit, corresponding to the position of the object on the video display screen, where the display unit may display information at plural positions. As a result, it is possible to easily obtain information about an object in video.

For example, it may be that the display control unit controls the display unit so that the object information is displayed at the second position included in a plurality of positions on the display unit and corresponding to the first position, each of the positions on the display unit corresponding to a different one of a plurality of positions on the video display screen.

With this, on the display unit of the information display device, candidates for display positions of related information about the object on the video display device are narrowed down to a predetermined number of positions. The viewer is capable of finding the related information more easily by viewing one of the predetermined number of positions. Furthermore, by excluding, from the candidates, the positions on the display unit and not easily viewed by the viewer (for example, edge portions on the display unit), the positions at which related information may be displayed can be limited to positions easily found and viewed by the viewer. This further facilitates obtainment of information about an object in video.

For example, it may be that the related information obtaining unit obtains the first position indicating a display screen region where the object is currently displayed among a plurality of display screen regions on the video display screen, and the display control unit controls the display unit so that the object information is displayed at the second position in a region included in a plurality of regions on the display unit and corresponding to the first position, each of the regions on the display unit corresponding to a different one of the display screen regions.

With this, on the display unit of the information display device, candidates for display positions of related information about the object on the video display device are narrowed down to a predetermined number of positions. In addition, for each region (display screen region) on the display screen of the video display device, a region on the information display device where related information about an object displayed in the display screen region is determined. This allows the viewer to know the display screen region of the object on the video display screen, so that the viewer is capable of finding the related information more easily by viewing the corresponding region on the display unit. This further facilitates obtainment of information about an object in video.

For example, it may be that the display control unit controls the display unit so that the object information is displayed at a new second position obtained by adding, to the second position, a relative position determined for a type of the object information included in the related information obtained by the related information obtaining unit.

With this, the information display device changes the display position of related information on the display unit according to the type of information such as a title of an object or detailed information about the object, so that the display position of the related information can be adjusted according to the type of information. For example, a title can be displayed at the upper portion of the display of the related information. With this, when looking for related information about an object, the viewer is capable of obtaining information about the object more easily by viewing the position, on the display unit, determined according to the type of information. For example, in order to find related information from the title of the object, the viewer is capable of easily finding the related information by viewing the upper portion of the display unit. This further facilitates obtainment of information about an object in video.

For example, it may be that when the display of the object on the video display screen starts or moves, the related information obtaining unit is configured to obtain the related information including the first position that is after the start or the move, and the display control unit controls the display unit so that a display of the object information starts at the second position or moves to the second position on the display unit in coordination with the start or the move of the display of the object on the video display screen, the second position corresponding to the first position that is after the start or the move.

With this, the information display device displays related information about an object currently displayed on the video display screen, in coordination with a change in the display on the video display screen. This further facilitates obtainment of information about an object in video.

For example, it maybe that the related information obtaining unit obtains (i) a region pattern determined according to a video scene displayed on the video display device and (ii) the first position indicating a display screen region where the object is currently displayed among the display screen regions determined according to the region pattern, and the display control unit controls the display unit so that the object information is displayed at the second position in a region corresponding to the first position, the region being included in a plurality of regions set for the display unit according to the region pattern.

With this, the pattern of the display screen regions of the video display device is changed according to a video scene displayed on the video display device. Along with the change, the pattern of the regions on the display unit of the information display device is also changed so that the viewer can easily obtain related information. For example, for a video scene that includes intensive motion, reduced number of display screen regions allows the viewer to easily obtain related information. This further facilitates obtainment of information about an object in video.

For example, it may be that when the display control unit controls the display unit so that a plurality of the object information items are displayed at the same second position, the display control unit controls the display unit so that most recently generated object information among the object information items is displayed.

With this, when the display area of the information display device is limited, it is possible to display newer information among plural related information items. As a result, it is possible to easily obtain newer information about an object in video.

For example, it may be that the display control unit controls the display unit so that the object information is displayed at the second position on the display unit, the second position having a relative position on the display unit that is equal to a relative position of the first position on the video display screen.

With this, the relative position of an object on the video display device is equal to the relative position of related information on the display unit of the information display device. The viewer is capable of finding related information about an object by referring to the position, on the display unit of the information display device, which corresponds to the relative position of the object on the display screen of the video display device. As a result, it is possible to easily obtain information about an object in video.

For example, it may be that the related information obtaining unit further obtains a display period indicating a period during which the object is displayed on the video display screen, and the display control unit: determines whether or not a current time is within the display period obtained by the related information obtaining unit; and when the display control unit determines that the current time is within the display period, controls the display unit so that the object information is displayed at the second position on the display unit.

With this, when an objet is being displayed on the video display device, information about the object can be displayed in real time.

For example, it may be that the related information obtaining unit obtains, as the object information, the related information including at least one of a title, detailed information, and a representative image of the object.

With this, the viewer can obtain at least one of a title, detailed information, and a representative image, as the related information about the object.

For example, it may be that a total number of the display screen regions is four, and a total number of the regions determined for the display unit is four.

With this, the viewer can obtain, from the information display device, related information about objects in the four display screen regions obtained by dividing the display screen of the video display device into four.

Embodiment 1

In Embodiment 1, a description is given of an example where related information about an object displayed on a video display device is displayed on an information display device in such a manner that a viewer can obtain information about the object in video more easily. More specifically, a description is given of an example where related information is displayed at the position on the information display device associated with the display position of an object on the video display device, in coordination with display of the object displayed on the video display device. Here, "display" in the phrase "in coordination with display of the object" refers to, for example, movement, change of the size or shape, appearance, or disappearance of the object on the video display screen.

Referring to FIG. 1 to FIG. 12, a description is given of Embodiment 1.

[1-1. Configuration]

FIG. 1 illustrates an example of a configuration of an information display system 100 according to Embodiment 1. The information display system 100 includes a broadcast station 110, a video display device (TV) 120, a database (DB) 130, a distribution server 160, and an information display device 170.

The broadcast station 110 broadcasts video programs via broadcast waves. The broadcast station 110 may provide video distribution not only wirelessly using broadcast waves, but also via wired network, such as a cable TV, or internet connection. The broadcast station 110 may distribute video programs in any distribution manner.

The video display device 120 displays the video program distributed from the broadcast station 110. Examples of the video display device 120 include a TV device. The video display device 120 displays a received video signal as video. A viewer views the video displayed on the video display device 120. The video display device 120 may also accumulate received video signals, and display the accumulated video signals.

The database (DB) 130 records or holds information about video programs distributed from the broadcast station 110. Examples of the information about video programs recorded onto the database 130 include information input by professionals 140 such as a metadata provider and information input by a general user 150. The database 130 may also record or hold not only information about video programs being broadcasted by the broadcast station 110 in real time, but also information about video programs previously broadcasted, distributed, and the like.

The distribution server 160 obtains information about a video program from the database 130 in response to a request from the information display device 170 to be described later, and transmits the obtained information to the information display device 170. The distribution server 160 may be, for example, a server which is available on the internet or the like and which is accessible by an unspecified number of people or a special majority of people.

The information display device 170 obtains, from the database 130 via the distribution server 160, information associated with a video program displayed on the video display device 120 or information about the video program, and displays the obtained information. At the time of viewing a video program, the viewer views information displayed on the information display device 170 while viewing the video displayed on the video display device 120. The information display device 170 may be implemented as a device put near the viewer of the video display device 120 or carried by the viewer when the viewer is viewing a video program. Examples of the information display device 170 include a tablet terminal, that is, a tablet information processing device, a tablet display device, and the like.

While viewing the video program on the video display device 120, the viewer obtains, by the information display device 170, information about an object of interest shown in the video program, so that the obtained information is displayed on the information display device 170. The viewer then views both the video displayed on the video display device 120 and information about the video at substantially the same time. Accordingly, the viewer can not only view the video program provided by the broadcast station or the like, but also collect or view information about objects which appear in the video program or information about content of great relevance to the video program. In other words, a conventional technique merely allows the viewer to view a video program, whereas the information display device according to the present disclosure allows the viewer not only to view the video program, but also to collect information about the video program. As a result, the viewer can enjoy wider variety of information. Here, the term "object" refers to an object displayed in video. An object refers to an object which is displayed in video and which has a possibility to be an object of interest to the viewer. Specific examples include a person, an animal, an item, a building, a natural object, a character, a sign, and a graphic.

Figure 2:
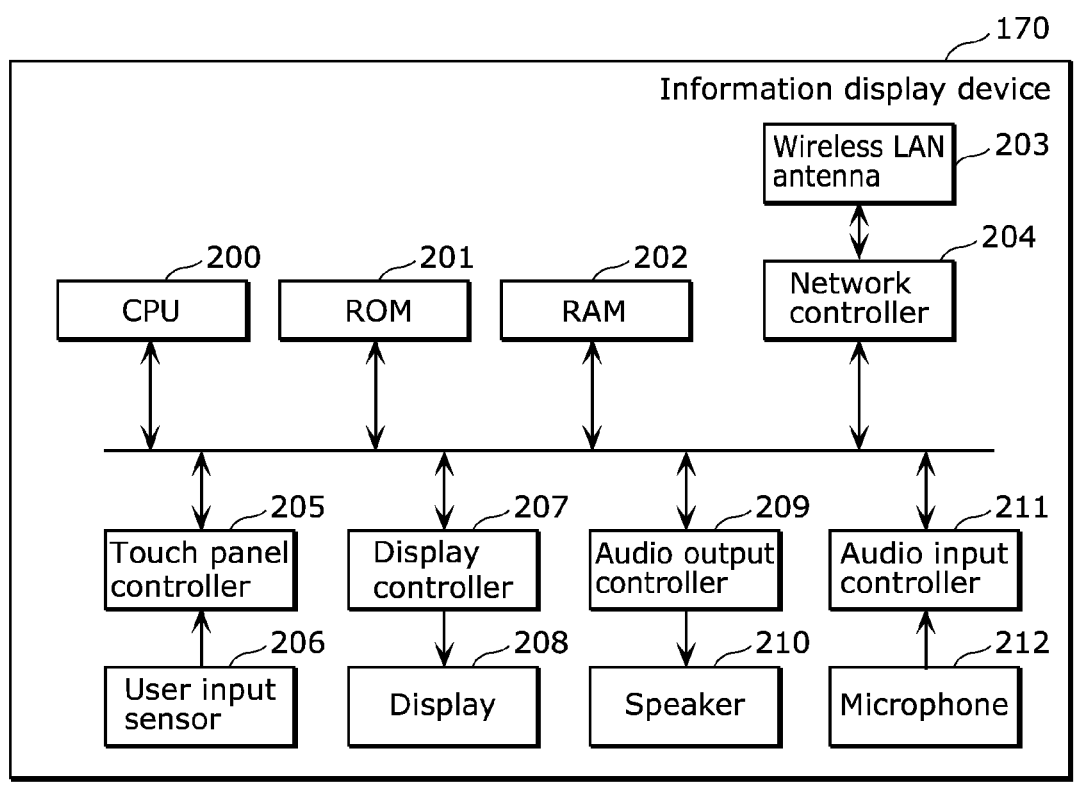
FIG. 2 illustrates an example of a hardware configuration of an information display device according to Embodiment 1.

FIG. 2 illustrates an example of a hardware configuration of the information display device 170 according to Embodiment 1. The information display device 170 includes a CPU 200, a ROM 201, a RAM 202, a wireless LAN antenna 203, a network controller 204, a touch panel controller 205, a user input sensor 206, a display controller 207, a display 208, an audio output controller 209, a speaker 210, an audio input controller 211, and a microphone 212.

The CPU 200 is a processing device, and controls the entirety of the information display device 170.

The ROM 201 holds information necessary for respective operations of the information display device 170. The ROM 201 stores, for example, software programs executed by the CPU 200, and various types of parameters which determine operations of the software programs.

The RAM 202 temporarily or permanently holds information necessary for respective operations of the information display device 170. The RAM 202 temporarily or permanently stores various variables necessary for the CPU 200 to execute software programs, and control data used for the CPU 200 to control various controllers.

The wireless LAN antenna 203 is an antenna for transmitting and receiving wireless radio waves used for the information display device 170 to communicate with outside via wireless local area network (LAN). Examples of the communication standard for wireless LAN communication include IEEE 802.11 standard. Other communication standards (for example, Bluetooth (registered trademark)) may also be used.

The network controller 204 controls data transmission and reception process when the information display device 170 externally transmits or receives information by using the wireless LAN antenna 203.

The touch panel controller 205 controls the user input sensor 206, receives a sensor signal from the user input sensor 206 as an input signal, and transmits the signal to the CPU 200 and the like.

The user input sensor 206 is a sensor which detects an input from a user of the information display device 170 (a viewer of the video display device 120). Specific examples of the device include a touch panel.

The display controller 207 receives image and video signals including information from the CPU 200 and the like, and performs control so that the signals are displayed on the display 208.

The display 208 displays images or video including various information, in response to the control by the display controller 207.

The audio output controller 209 receives a digital audio output signal from the CPU 200 and the like, converts the digital signal into an analog signal, and output the converted signal to the speaker 210.

The speaker 210 outputs, as audio, the analog audio signal from the audio output controller 209.

The audio input controller 211 converts the analog audio signal from the microphone 212 into a digital audio signal or the like, and output the converted signal to the CPU 200 or the like.

The microphone 212 collects surrounding sound of the information display device 170, and converts the collected sound into an analog electric signal.

Figure 3A:
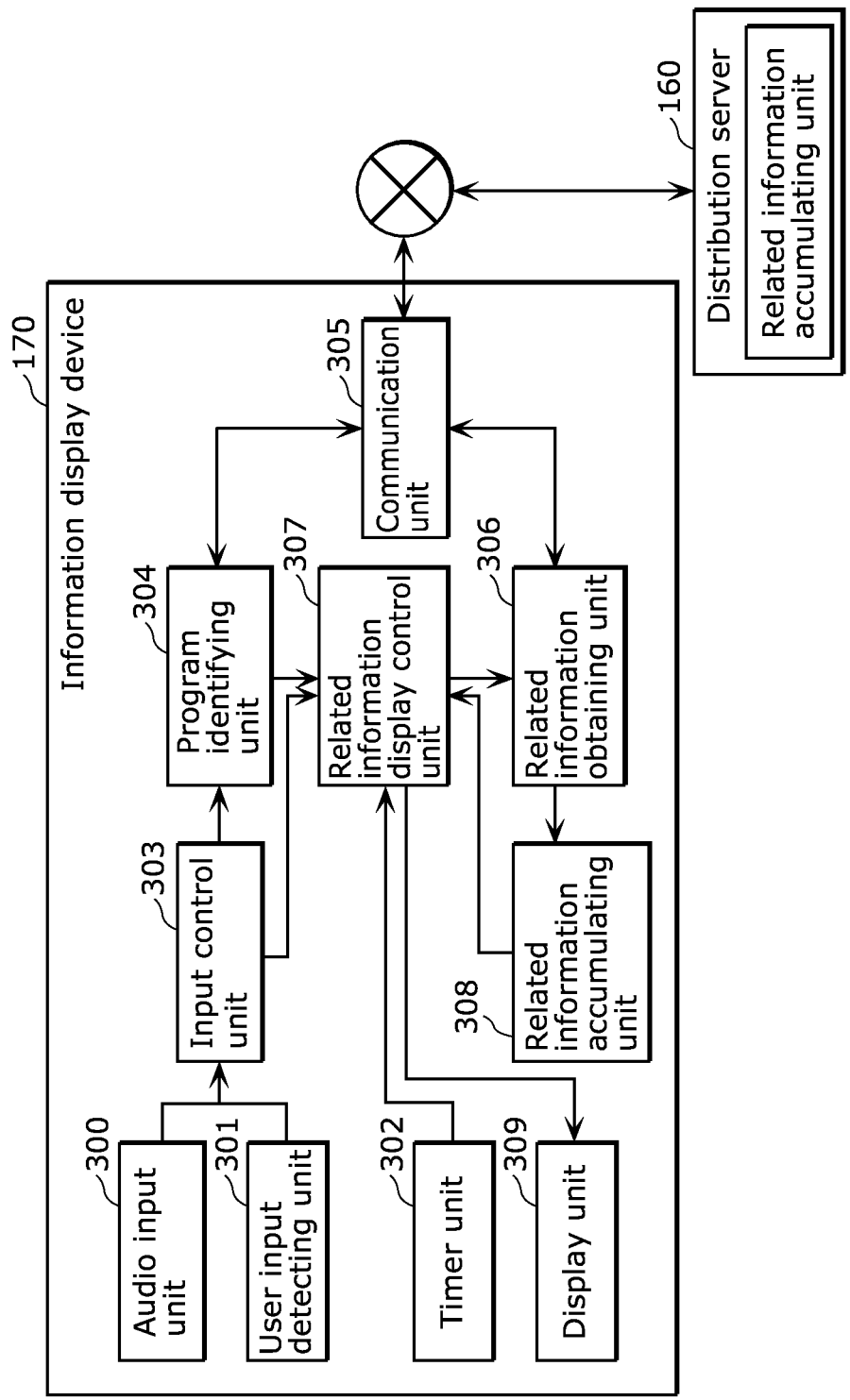
FIG. 3A illustrates an example of a functional configuration of the information display device according to Embodiment 1.

FIG. 3A illustrates an example of a functional configuration of the information display device 170 according to Embodiment 1. The information display device 170 includes an audio input unit 300, a user input detecting unit 301, a timer unit 302, an input control unit 303, a program identifying unit 304, a communication unit 305, a related information obtaining unit 306, a related information display control unit 307, a related information accumulating unit 308, and a display unit 309.

The audio input unit 300 collects surrounding sound of the information display device 170. The audio input unit 300 corresponds to the microphone 212 in the hardware configuration in FIG. 2.

The user input detecting unit 301 receives an input from a user of the information display device 170. The user input detecting unit 301 is, for example, a touch panel. The user input detecting unit 301 corresponds to the user input sensor 206 in the hardware configuration in FIG. 2.

The timer unit 302 measures time. The timer unit 302 is, for example, a clock module which measures time using an oscillator or the like.

The input control unit 303 converts an input signal from the audio input unit 300 or the user input detecting unit 301 into an appropriate information signal. For example, the input control unit 303 converts an input analog signal from various sensors or the like into a digital signal that can be easily processed. The input control unit 303 corresponds to the touch panel controller 205 or the audio input controller 211, for example, in the hardware configuration in FIG. 2.

The program identifying unit 304 generates information for identifying video currently displayed on the video display device 120 (audio identification information), based on the audio signal input from the audio input unit 300 via the input control unit 303. The information display device 170 is carried by a viewer of video on the video display device 120 or put near the viewer. The information display device 170 obtains audio of a video program displayed or the like on the video display device 120 by the audio input unit 300. The audio signal from the audio input unit 300 is input to the program identifying unit 304 via the input control unit 303.

The program identifying unit 304 extracts information serving as audio characteristics from the input audio signal, that is, from the audio of the video program currently displayed on the video display device 120 at the time. Examples of the audio characteristic information include frequency distribution, level of each frequency, and a signal obtained by extracting only an audio signal of a given frequency band. The audio characteristic information may be any information as long as the information can identify audio characteristics. Such audio characteristic information need not be necessarily extracted. In other words, the input audio signal may be output as it is. In such a case, the amount of communication performed by the communication unit 305 in the subsequent stage will increase. Calculation of the audio characteristic information reduces such an increase in the amount of communication. The program identifying unit 304 performs predetermined arithmetic processing on the audio characteristic information thus extracted, and generates audio identification information about the input audio signal.

The program identifying unit 304 further transmits the generated audio identification information to the distribution server 160 via the communication unit 305 to be described later. In response to the transmission of the audio identification information, the program identifying unit 304 receives, from the distribution server 160, information for identifying the video program corresponding to the audio signal (program identifying information).

The communication unit 305 transmits the audio identification information generated by the program identifying unit 304 to the distribution server 160.

The distribution server 160 identifies the video program currently displayed on the video display device 120 from the audio identification information received from the information display device 170, based on information in the database 130. The distribution server 160 may also identify a video display position (video scene) in the video program at the time of obtainment of the audio.

The distribution server 160 transmits information about the identified video program (program identifying information) to the information display device 170. The communication unit 305 receives information about the video program. The communication unit 305 obtains related information in the database 130 and about an object in the video scene currently displayed on the video display device 120 (related information corresponding to the video scene of the video program), from the distribution server 160 or the like based on the program identifying information. The communication unit 305 corresponds to the wireless LAN antenna 203 and the network controller 204 in the configuration illustrated in FIG. 2.

The related information obtaining unit 306 obtains related information corresponding to the video scene in the video program from the information received by the communication unit 305 from the distribution server 160. The related information obtaining unit 306 may accumulate the obtained related information in the related information accumulating unit 308.

The related information display control unit 307 outputs, to the display unit 309, information to be displayed and included in the related information, using the related information obtained by the related information obtaining unit 306 or the related information obtained by the related information obtaining unit 306 and accumulated in the related information accumulating unit 308. The related information display control unit 307 may use timing information input from the timer unit 302 to, for example, update the related information displayed on the display unit 309. A description is given later of control for the display positions and the like performed when the related information display control unit 307 actually displays related information and the like on the display unit 309. The related information display control unit 307 corresponds to a display control unit 307A.

The program identifying unit 304, the related information obtaining unit 306, and the related information display control unit 307 correspond to the software programs processed by the CPU 200 in FIG. 2.

The related information accumulating unit 308 records and holds the related information obtained by the related information obtaining unit 306. The related information accumulating unit 308 corresponds to the ROM 201 or the RAM 202 in the configuration illustrated in FIG. 2.

The display unit 309 displays the related information in accordance with the control performed by the related information display control unit 307. The display unit 309 corresponds to the display controller 207 and the display 208 in the configuration illustrated in FIG. 2.

With the above functional configuration, in the information display device 170, the program identifying unit 304 generates audio identification information for identifying the video program currently viewed by the viewer of the video display device 120, and transmits the generated information to the distribution server 160. Subsequently, the communication unit 305 obtains the related information transmitted from the distribution server 160. The information display device 170 displays, on the display unit 309, information about the video program on the video display device 120 in accordance with the related information. Accordingly, the viewer is capable of enjoying both the video program currently displayed on the video display device 120 and the information related to the video program.

Figure 4:
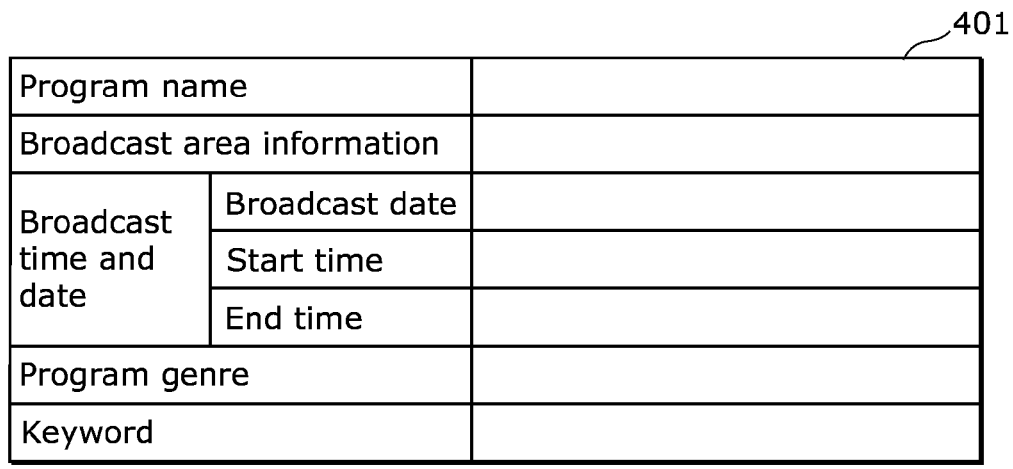
FIG. 4 illustrates an example of program identifying information according to Embodiment 1.

FIG. 4 illustrates an example of program identifying information for identifying a video program. Program identifying information 401 illustrated in FIG. 4 includes "program name", "broadcast area information", "broadcast time and date", "program genre", and "keyword".

The "program name" refers to information indicating the name, title or the like of a broadcast video program. The "broadcast area information" refers to information for identifying the actual broadcast area of a video program in the case where the video program is broadcasted, for example, via radio waves or cable TV distribution. The "broadcast time and date" refers to time information at which the program is broadcasted, distributed, or the like, and includes information about "broadcast date" "broadcast start time", and "broadcast end time". The "program genre" refers to information indicating the genre of a video program, and indicates which one of predetermined classified items the video program corresponds to according to the content of the program. The "keyword" are words describing the characteristics of the content or the like of the video program.

Figure 5:
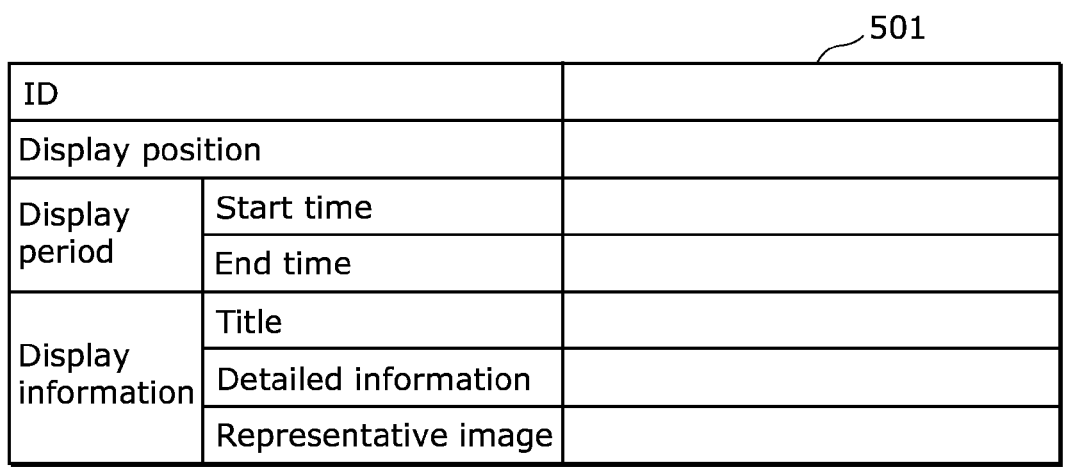
FIG. 5 illustrates an example of related information according to Embodiment 1.

FIG. 5 illustrates an example of related information returned from the distribution server 160. The related information 501 illustrated in FIG. 5 includes "ID", "display position", "display period", and "display information". The "display period" includes a "start time" and an "end time". The display information includes, as information, "title", "detailed information", or "representative image". By making one related information item correspond to one object, the information display device 170 is capable of presenting related information corresponding to an object in such a manner that the viewer can easily view the related information.

The "ID" is information for identifying the related information. For example, the ID is information uniquely determined so that related information items can be distinguished from each other.

The "display position" refers to positional information indicating a position on the display screen of the video display device 120 at which the object corresponding to the related information is displayed. The positional information is indicated by, for example, positional coordinates on the display screen. More specifically, for example, in the case of a video program having a resolution of 1920×1080 of HDTV (High Definition TV), the positional information indicates the positional coordinates (for example, (480, 270)) on the display screen. Furthermore, in the case where the video display screen of the video display device 120 is divided into plural regions (for example, top-left, top-right, bottom-left, and bottom-right), the positional information may indicate one of the regions (for example, top-left). The "display position" corresponds to the first position.

The "display period" refers to information indicating a period during which the object in the video program corresponding to the related information is displayed on the display screen of the video display device 120. The start time and the end time of the display period may be indicated as relative time from the start of the video program, or may be specified by the number of frames or the like from the start of the video program.

The "display information" indicates information about the object included in the video program corresponding to the related information. The "title" is a title for the information about the object. Examples of the title include a name or a nickname of an object, and texts associable from the object. The "detailed information" indicates detailed information about the object. Examples of the detailed information include texts or sentences describing the details of an object, information indicating the location, on the internet, of the detailed descriptions of an object, such as an URL or an IP address, and an URL that is heavily associated with an object (for example, in the case where an object is a person, the URL of the blog, Twitter, or Facebook page managed by the person). The "representative image" is an image showing an external view or the like of an object. Examples of the representative image include image data of a photograph of a person who is the object, and image data of an article which is the object. The representative image may include image data indicating characteristics of an object, other than the above.

Upon receipt of the related information illustrated in FIG. 5 from the distribution server 160, the information display device 170 appropriately displays, on the display unit 309, display information (title, detailed information, or representative image) included in the related information, based on information about the display position and display period.

FIG. 5 illustrates an example of the related information, and the related information according to the present disclosure is not limited to the related information 501 illustrated in FIG. 5. Other than the related information 501 illustrated in FIG. 5, the related information may include display information about an object or the like included in video of the video program displayed on the video display device 120 and information for controlling display of the display information.

Figure 6:
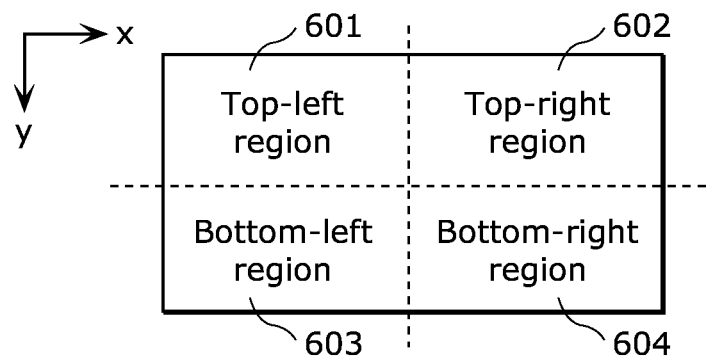
FIG. 6 illustrates an example of division of a display region on the information display device.

FIG. 6 illustrates an example of division of a display region of the information display device. In other words, FIG. 6 illustrates positions of the display regions where the information display device 170 displays information included in the related information. The related information display control unit 307 determines one of the regions of the display unit 309 in which the display information is to be displayed, based on information about the display position (first position) included in the related information. The position on the display unit 309 at which the display information is displayed corresponds to the second position. In Embodiment 1, the display screen on the display unit 309 is logically divided into four regions as illustrated in FIG. 6, that are, a top-left region 601, a top-right region 602, a bottom-left region 603, and a bottom-right region 604.

The number of regions into which the display region of the display unit 309 is divided is not limited to four, but may be any number that is two or more. Furthermore, the pattern of division is not limited to the pattern illustrated in FIG. 6 where the display region is horizontally divided into two and vertically into two, but may be any pattern. For example, in the case where the number of divisions is four, the pattern may be one where the display region is horizontally divided into four, but not divided vertically.

Instead of logically dividing the display region of the display unit 309, it may be that each position on the video display screen of the video display device is determined to correspond to a different one of positions on the display unit 309, and that the position on the display unit 309 at which display information is to be displayed is determined based on information about the display position included in the related information.

Furthermore, the positions on the display unit 309 may be determined from among regions not including the edge portion of the display unit 309.

Hereinafter, a description is given of the case where the display unit 309 is divided into four regions that are the top-left region 601, the top-right region 602, the bottom-left region 603, and the bottom-right region 604.

The related information display control unit 307 determines one of the four regions illustrated in FIG. 6 in which display information is to be displayed, according to the display position included in the related information.

More specifically, when the information about the display position is indicated by coordinate information such as (x, y), the related information display control unit 307 determines, based on the value of x which indicates a position in the horizontal direction of the screen, which one of a screen-left region, including the top-left region 601 and the bottom-left region 603, and a screen-right region, including the top-right region 602 and the bottom-right region 604, the display position belongs to. The display position in the display information is determined to be the screen-left region (601 or 603) when x can take a value of 0≤x≤1920 and the actual value of x is within a range of 0≤x≤960. When the actual value of x is within a range of 960<x≤1920, the display position in the display information is determined to be the screen-right region (602 or 604).

In a similar manner, when y can take a value of 0≤y≤1080 and the actual value of y is within a range of 0≤y≤540, the display position in the display information is determined to be a screen-top region (601 or 602). On the other hand, when the actual value of y is within a range of 540<y≤1080, the display position in the display information is determined to be a screen-bottom region (603 or 604).

The related information display control unit 307 determines the position on the display unit 309 at which the information is to be displayed, based on information about the display position included in the related information. More specifically, the related information display control unit 307 determines, in accordance with the information about the display position in the related information, which one of predetermined logically divided regions of the display unit 309 the related information is to be displayed. The information about the display position in the related information is associated with the position on the display screen of the video display device 120 at which the object corresponding to the related information is being displayed. Hence, when an object of interest is displayed on the video screen (display screen) of the video display device 120 currently viewed by the user of the information display device 170, information about the object is displayed, according to the position of the object on the video screen, in the corresponding region on the display unit 309 of the information display device 170. For example, the related information about the object currently displayed in the top-left region on the video display device is displayed in the top-left region on the display unit 309.

As a result, even when the user of the information display device 170 is using both the video display device 120 and the information display device 170, the user can relatively easily find the display information (related information) that the user wants from the display unit of the information display device 170.

With such a control, the related information can be displayed at the display position, on the display unit 309, corresponding to the display position of the object on the video display device 120.

Furthermore, the information display device 170 displays information in one of the logically divided regions on the display screen of the display unit 309 as illustrated in FIG. 6. Since the user of the information display device 170 knows that information is to be displayed in one of the divided regions, the user is only necessary to search the four regions for the information that the user wants. Furthermore, since the region in which the information that the user wants is to be displayed is determined based on positional information of an object on the video display device, the information that the user wants is displayed in a region closest to the region where the object appeared among the four regions. Hence, the viewer is only necessary to search a specific region (a region closest to the position at which the object appears) for the information.

It can also be said that the information display device 170 according to Embodiment 1 transforms coordinates such that the resolution of the display position on the display unit 309 is lower than the resolution of the position indicated by the display position in the related information by logically dividing a region on the display unit 309. Such a coordinate transformation is allowable because it is considered that the user of the information display device 170 gives importance to easily finding information, and is less interested in accuracy of the display position of the information.

With above, the related information display control unit 307 can display information to the user of the information display device 170 so that the user can view the information more easily, by determining which one of the regions obtained by logically dividing the display screen of the display unit 309 display information of related information is to be displayed in, according to the information about the display position in the related information.

[1-2. Operation]

Figure 7:
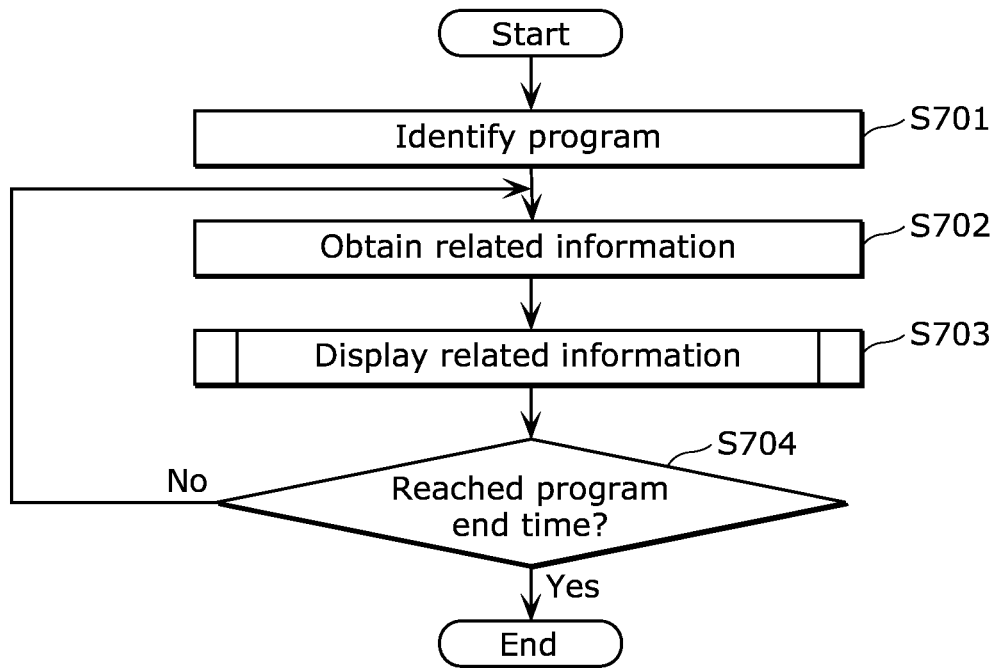
FIG. 7 is an exemplary flowchart of processing for obtaining and displaying related information according to Embodiment 1.

FIG. 7 is an exemplary flowchart of processing for obtaining and displaying related information according to Embodiment 1.

(Step S701) The program identifying unit 304 extracts audio characteristics from an audio signal input from the audio input unit 300 and the input control unit 303, and generates identification information unique to the audio signal. More specifically, for example, the program identifying unit 304 applies a given hush function to the characteristic part of a predetermined period of input audio digital information (signal). The hush values calculated by the hush function process are the identification information of the input audio signal. The identification information described in Embodiment 1 may be generated by a method other than the above. For example, a hush function may be applied to the entire input audio digital information. Instead of the hush function, an arbitrary function may be used which can convert an audio signal or the like into a numerical value.

The program identifying unit 304 transmits the identification information unique to the audio signal to the distribution server 160 using the communication unit 305. In response to the transmission, the program identifying unit 304 obtains information about the video program corresponding to the audio (program identifying information) from the distribution server 160 by using the communication unit 305. The program identifying unit 304 records the obtained program identifying information in the related information accumulating unit 308.

(Step S702) The related information display control unit 307 instructs the related information obtaining unit 306 to obtain related information about the video program currently displayed on the video display device 120, based on the program identifying information. The related information obtaining unit 306 requests, based on information about a program transmitted from the related information display control unit 307, related information corresponding to the program to the distribution server 160 using the communication unit 305. Upon receipt of the requested related information from the distribution server 160, the related information obtaining unit 306 records the information in the related information accumulating unit 308.

(Step S703) The related information display control unit 307 performs display control so that the related information about the video program recorded in the related information accumulating unit 308 is displayed on the display unit 309. A description is given later of specific details of the display control performed by the related information display control unit 307.

(Step S704) The related information display control unit 307 compares the obtained program identifying information with the time information or the like provided from the timer unit 302, and determines whether or not the video program displayed on the video display device 120 has ended. When the video program is ending or has already ended, the processing ends. On the other hand, when it is determined after the comparison that the video program is continuing, the related information display control unit 307 returns to Step S702, and updates and obtains related information, performs display control, and the like.

Figure 8:
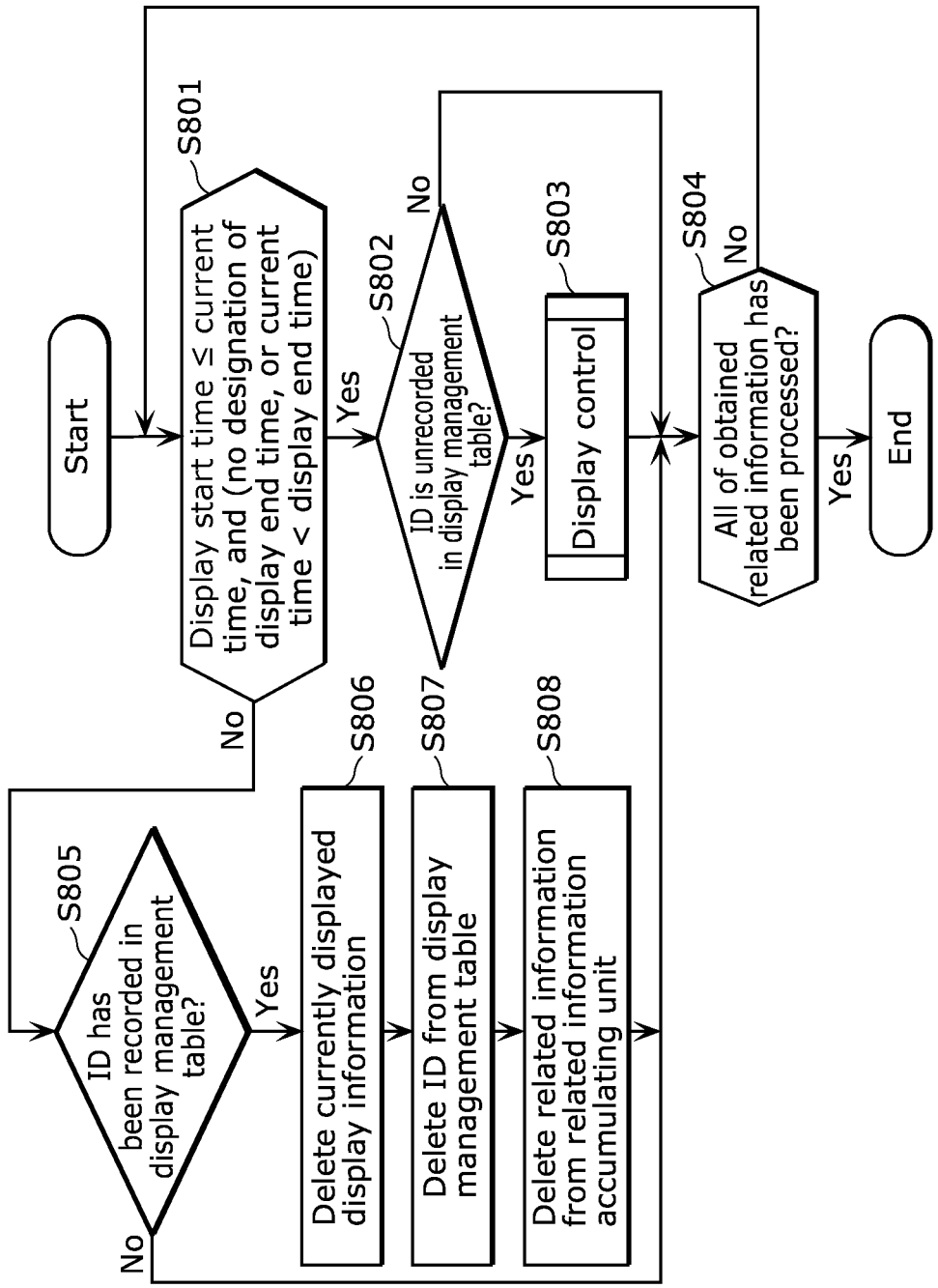
FIG. 8 is an exemplary flowchart of processing for performing display control based on obtained related information.

FIG. 8 is an exemplary flowchart of processing for display control based on the obtained related information, according to Embodiment 1. In other words, FIG. 8 is an exemplary flowchart of processing performed by the related information display control unit 307 to perform display control of the display unit 309 based on the related information recorded and held by the related information accumulating unit 308. The flowchart illustrates detailed processing of Step S703 in the flowchart of FIG. 7.

When the program identifying unit 304 obtains video program identifying information corresponding to the video program currently displayed on the video display device 120 in Step S702, the related information display control unit 307 starts processing in the flowchart in FIG. 8.

(Step S801) The related information display control unit 307 reads out related information from the related information accumulating unit 308. The related information display control unit 307 compares the start time and the end time of the display period included in the read related information with current time obtained from the timer unit 302. When it is determined after the comparison that the current time is within the display period (Yes in Step S801), the related information display control unit 307 proceeds to Step S802. In contrast, when it is determined that the current time information is not within the display period (No in Step S801), the related information display control unit 307 proceeds to Step S805.

(Step S802) The related information display control unit 307 determines whether or not the related information has already been recorded, based on the ID included in the related information. The related information display control unit 307 makes the determination by comparing the ID of the related information with the recorded ID in the display management table.

Figures 9, 10:
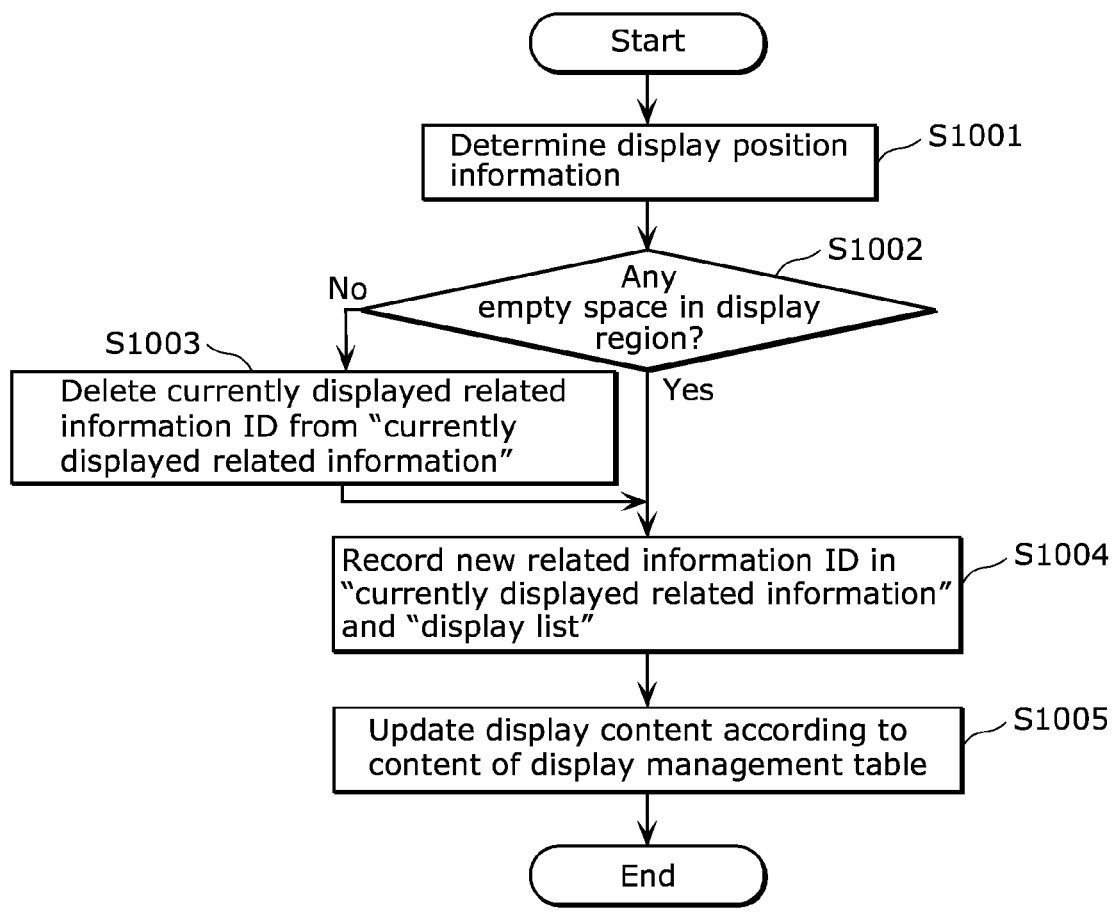
FIG. 9 illustrates an example of a display management table according to Embodiment 1.
FIG. 10 is an exemplary flowchart of processing for updating display content of related information displayed on an information display device, based on the display management table.

FIG. 9 illustrates an example of the display management table according to Embodiment 1. The display management table 901 is stored and held in the related information accumulating unit 308 or the like with related information. The display management table 901 includes items of "display region", "currently displayed related information", and "display list". The display management table 901 manages these items for respective divided display regions on the display unit 309 illustrated in FIG. 6. FIG. 9 illustrates the display regions of "top-left (region)", "top-right (region), "bottom-left (region)", and "bottom-right (region)". In Step S803 to be described later, when the related information display control unit 307 displays, on the display unit 309, display information included in new related information, the related information display control unit 307 records the ID of the related information in the item of "currently displayed related information" in the display management table.

The term "whether or not the ID in the related information has been recorded" refers to whether or not display information in the related information has already been currently displayed on the display unit 309. When the related information has already been currently displayed (No in Step S802), the related information display control unit 307 continues display of the related information, and proceeds to Step S804. On the other hand, when the related information has not yet been displayed (Yes in Step S802), the related information display control unit 307 proceeds to Step S803.

(Step S803) As described above, the related information display control unit 307 displays display information included in the related information in one of the four logically divided regions on the display unit 309, based on the information about the display position. A description is given later of the specific display control.

(Step S804) The related information display control unit 307 repeats the same processing on the related information accumulated in the related information accumulating unit 308. The flow ends after all the related information items are processed.

(Step S805) When the current time is not within the display period, the related information display control unit 307 checks whether or not the ID of the related information has been recorded in the display management table. The ID is considered as being recorded when the current time has passed the display end time or the like indicated by the display period of previously displayed related information. In this case (Yes in Step S805), for example, the related information display control unit 307 deletes currently displayed information by Steps 806, 807, and 808. On the other hand, when the related information is not currently displayed (No in Step S805), processing proceeds to S804.

(Step S806) The related information display control unit 307 deletes display information of the related information already being displayed on the display unit 309. The region on the display unit 309 in which the display information is currently displayed is determined from the relationship between the related information ID and the display region, based on the display management table.

(Step S807) The related information display control unit 307 deletes the related information ID recorded in the "currently displayed related information" in the display management table. As a result, the related information is excluded from display targets from the information for control, too.

(Step S808) The related information display control unit 307 deletes the related information recorded in the related information accumulating unit 308. The deletion need not be necessarily performed.

With the process flow as described above, the related information display control unit 307 is capable of displaying the related information received from the distribution server 160, on the display unit 309 according to each display period.

FIG. 10 is an exemplary flowchart of processing performed by the related information display control unit 307 to update the display content of the related information displayed on the display unit 309, based on the display management table 901. The flowchart illustrates detailed processing of Step S803. FIG. 11 is also a diagram for illustrating update of the display management table. Referring to FIG. 10 and FIG. 11, a detailed description is given of processing performed by the related information display control unit 307 to update the display content of related information.

Relative to the related information determined in Step 802 to be displayed, the related information display control unit 307 determines the actual region on the display screen of the display unit 309 in which the related information is displayed, from information about the display position.

(Step S1001) In the case where the display region is logically divided as illustrated in FIG. 6, the related information display control unit 307 determines one of the regions in which information is to be displayed, based on information about the display position. For example, the region in which the information is to be displayed may be determined from the values of the display position (x, y) as described above. The determination method is not limited to the above method.

(Step S1002) When the display region in which related information is to be displayed is determined in Step S1001, the related information display control unit 307 determines whether or not the determined region already has another related information item currently displayed (whether or not the determined display region has an empty space). Specifically, the related information display control unit 307 makes the determination using the display management table illustrated in FIG. 9. The related information display control unit 307 obtains the ID of the already displayed related information recorded in the "currently displayed related information" for the region in which related information is to be displayed, from the display management table. If the ID of another related information item has already been recorded, it means that the region already has currently displayed related information. If no ID of related information has been recorded in the "currently displayed related information" for the determined region, it means that the region has no currently displayed related information. In such a manner, the related information display control unit 307 determines whether or not the region in which the information is to be displayed already has another currently displayed related information (whether or not the display region has an empty space). When other related information has already been currently displayed (when there is no empty space in the display region) (No in Step S1002), the related information display control unit 307 proceeds to Step S1003. On the other hand, when no other related information is currently displayed (when there is an empty space in the display region) (Yes in Step S1002), the related information display control unit 307 proceeds to Step S1004.

A description has been given above of the case where one related information item can be displayed in the determined region, but two or more related information may be displayed in the region. In such a case, in Step S1002, instead of determining whether or not another related information is already being displayed, it may determine whether or not the number of currently displayed other related information items is the maximum number.

In FIG. 11, (a) is an example of a display management table when another related information item A already being displayed has been recorded in the display management table. The related information A has been recorded in the "currently displayed related information" and "display list" of the "bottom-left region" in the display management table.

(Step S1003) The related information display control unit 307 deletes the recorded related information ID from the "currently displayed related information". Accordingly, the "currently displayed related information" has an empty space so that new related information can be displayed.

Compared to the state in (a) in FIG. 11, (b) in FIG. 11 illustrates the state where the related information A currently displayed in the bottom-left region is deleted from the "currently displayed related information". Although the related information A is deleted from the "currently displayed related information", the related information A is continuously recorded in the "display list".

(Step S1004) The related information display control unit 307 records the ID of related information to be newly displayed in "currently displayed related information" for the corresponding "display region" in the display management table. Accordingly, the display information content of the new related information becomes a display target. The related information display control unit 307 also records the ID of the new related information in the "display list".

In FIG. 11, (c) illustrates a state where related information B is newly recorded, compared to the state in (b) in FIG. 11. It shows that related information B has been recorded in both the "currently displayed related information" and the "display list".

(Step S1005) The related information display control unit 307 updates the display content of the display unit 309 according to the content of the display management table. As described in Step S1003 and Step S1004, the display management table holds information to be displayed on the display unit 309, and thus, the related information display control unit 307 updates the display content based on the information.

Figure 12:
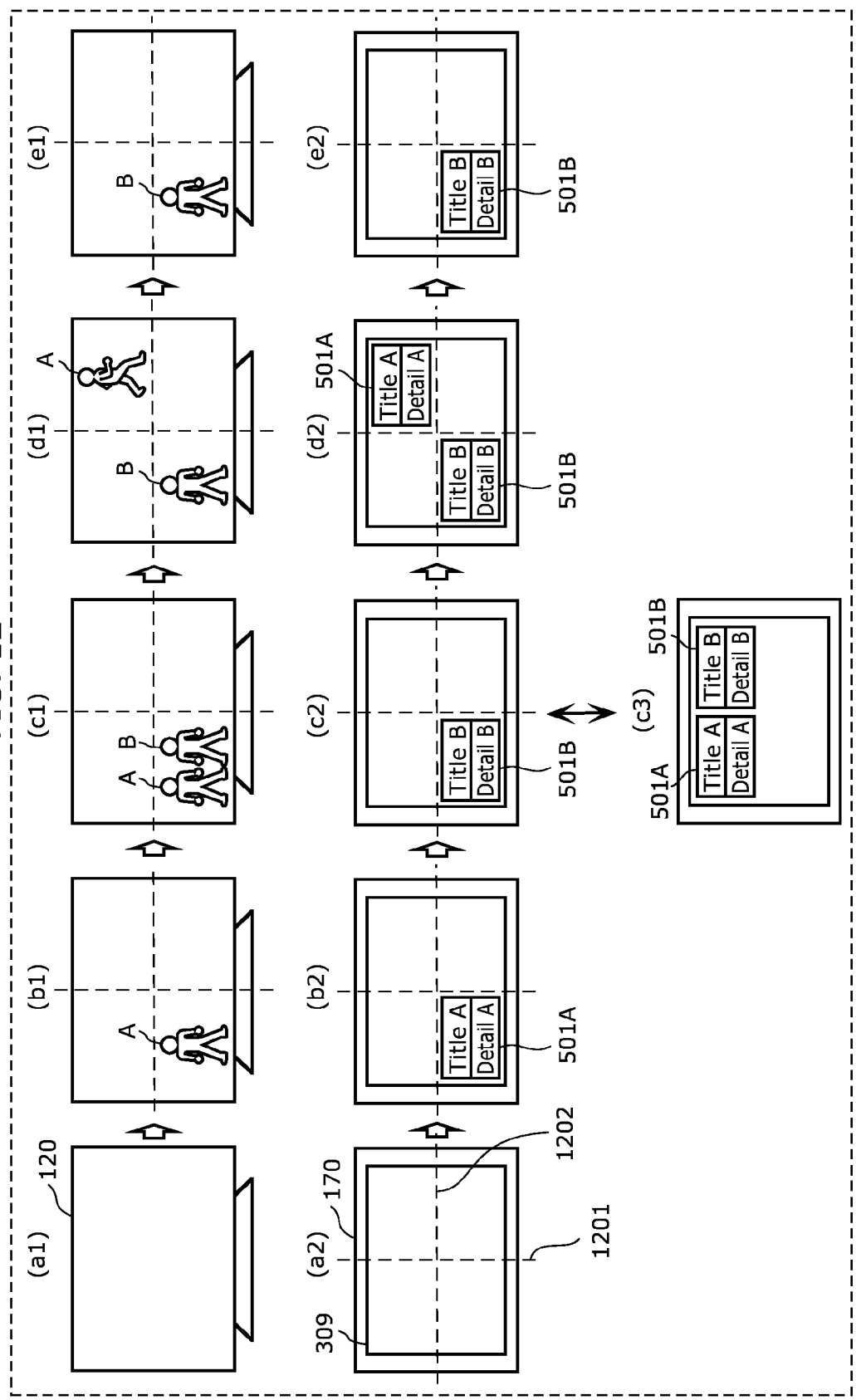
FIG. 12 is a diagram for illustrating update of display content of a video display device and display content of the information display device.

FIG. 12 is a diagram for illustrating update of display content of the video display device 120 and display content of the information display device 170. More specifically, FIG. 12 illustrates the display content when the related information display control unit 307 updates the display content of the display unit 309 in coordination with the update of the display content of the video display device 120, according to the flowchart shown in FIG. 10.

In FIG. 12, (a1) shows a state where the video display device 120 displays no object. The state of the information display device 170 at this time is shown in (a2) in FIG. 12. In FIG. 12, (a2) shows a state where the display unit 309 displays no information when control starts. In (a2) in FIG. 12, a vertical line (a line 1201) and a horizontal line (a line 1202) indicate logical boundaries of the divided regions of the display region. The line 1201 and the line 1202 may be displayed on the display unit 309 visibly or invisibly for a viewer of the information display device 170.

Next, as in (b1) in FIG. 12, a person A that is an object appears on the video display device 120 (display starts).

In FIG. 12, (b2) shows an example where the information display device 170 displays, on the display unit 309, related information 501A that is related information about the person A. The related information 501A is displayed in the bottom-left region on the display unit 309 based on the information about the display position. Specific content of the display information include the "title" and "detailed information" in the related information 501A. Note that the information displayed here is not limited to the example. When the related information includes a representative image or the like, the display information may include such an image. Furthermore, the display information may include at least one of the "title", "detailed information", or "representative image".

Next, as shown in (c1) in FIG. 12, a person B that is another object appears on the video display device 120 (display starts).

In FIG. 12, (c2) shows an example where related information 501B that is related information about the new object B is displayed. Here, as illustrated in the flowchart in FIG. 10, information in the related information B that is new related information is displayed in the bottom-left region on the display unit 309. Here, the information display device 170 may display not only the related information 501B about the object B but also the related information 501A about the object A as shown in (c3) in FIG. 12. In addition, a user input may be made to switch between the display of (c2) in FIG. 12 and the display of (c3) in FIG. 12, or the switching may be made automatically at a predetermined cycle. The method of switching between displays is not limited to these examples.

In (c3) in FIG. 12, an example is shown where the content of "display list" in the display management table in the state of (c2) in FIG. 12 is displayed. The display list includes the currently displayed related information 501B and the related information 501A previously displayed in the same region. In such a manner, when there are plural related information items to be displayed in the same region, the related information display control unit 307 may display only most recent related information for a normal display and display list of related information items included in the display list for a list display as shown in (c3) in FIG. 12. Accordingly, the user is capable of viewing other information that is not being displayed.

Next, as shown in (d1) in FIG. 12, the person A moves to the top-right portion on the screen on the video display device 120.

In FIG. 12, (d2) shows an example where the object A moves from the bottom-left region to the top-right region on the screen on the video display device 120. Here, the display position of the related information A is changed from the bottom-left region to the top-right region. Such a movement of the display information on the screen can be made by using different IDs between the case where the related information A is displayed in the bottom-left region and the case where the related information A is displayed in the top-right region, using the flowchart shown in FIG. 10.

Next, as shown in (e1) in FIG. 12, the person A disappears from the screen on the video display device 120 (display ends).

In FIG. 12, (e2) shows an example of the display content on the display unit 309 when the display period of the related information 501A about the person A has ended. In this case, as illustrated in the flowchart in FIG. 8, the ID of the related information is deleted from the display management table, so that the related information display control unit 307 updates the content on the display unit 309 according to the display management table after the deletion.

The related information may include a "region pattern". The "region pattern" is determined for each video (program) displayed on the video display device 120 or each video (program) scene, and indicates a pattern of logical division of the video display screen. Examples of the region pattern include information indicating the number of divisions (divided into four, two, etc), and division pattern (horizontally divided into two and vertically divided into two, vertically divided into four, etc). Furthermore, the region pattern may be changed in the middle of one video (program). For example, the number of the display screen regions may be reduced for the scenes that include intensive motion of objects. When related information include the "region pattern", the "display position" indicate the position of an object on the video display screen logically divided according to the region pattern.

Upon receipt of the related information including the "region pattern" and the "display position", the information display device 170 displays the related information in the region indicated by the "display position" among the regions obtained by logically dividing the display unit 309 according to the "region pattern". For example, in a scene that includes intensive motion of an object, relation information also moves intensively in coordination with the motion of the object in a conventional technique, but the related information moves less according to the present disclosure. Accordingly, the viewer is capable of obtaining related information easily.

Figure 3B:
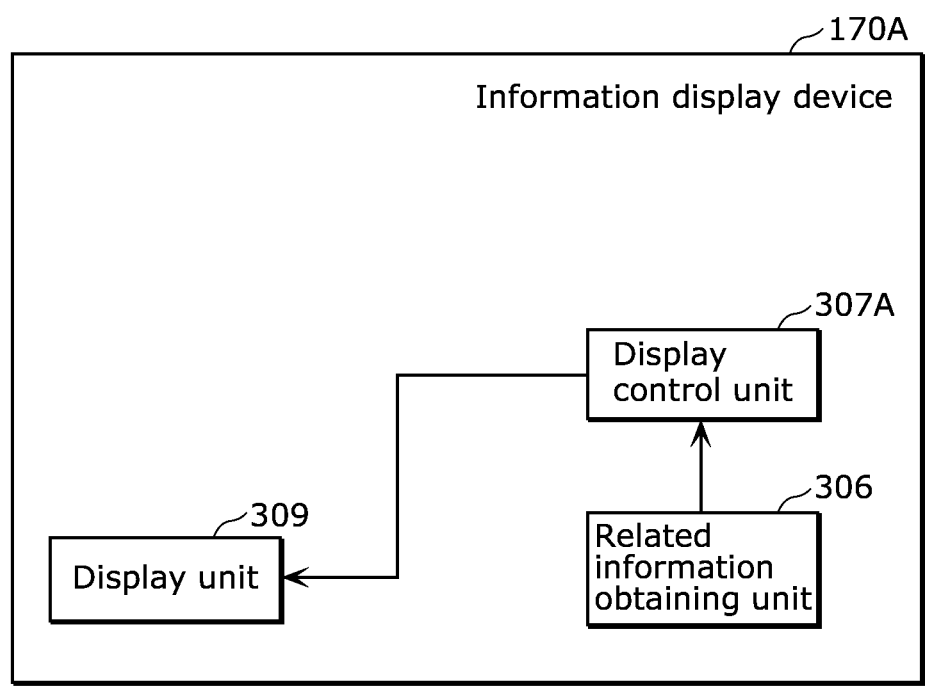
FIG. 3B illustrates another example of the functional configuration of the information display device according to Embodiment 1.

The information display device according to present disclosure requires the structural elements described below. FIG. 3B illustrates another example of the functional configuration of the information display device (information display device 170A) according to Embodiment 1. As illustrated in FIG. 3B, the information display device 170A includes a related information obtaining unit 306, a display control unit 307A, and a display unit 309.

The related information obtaining unit 306 obtains related information which includes: positional information indicating a first position of an object currently displayed on a video display screen on a video display device that is external to the information display device, and object information indicating attribute information of the object.

The display unit 309 displays object information included in the related information obtained by the related information obtaining unit 306.

The display control unit 307A controls the display unit 309 so that the object information is displayed at a second position on the display unit 309 corresponding to the first position indicated by the positional information included in the related information, in coordination with the display of the object on the video display screen.

Accordingly, the information display device facilitates obtainment of information about an object in video.

[1-3. Effects Etc.]

As described above, according to the information display device in Embodiment 1, a viewer of video is capable of obtaining, from the information display device, related information about an object currently displayed on the video display screen on the video display device. The position of the related information displayed on the display unit (display screen) corresponds to the position of the object on the video display screen. Hence, the viewer is capable of finding related information about the object easily by viewing the position on the display unit corresponding to the position of the object on the video display screen, where the display unit may display information at plural positions. As a result, it is possible to easily obtain information about an object in video.

Furthermore, candidates for display positions, on the display unit of the information display device, of related information about the object displayed on the video display device are narrowed down to a predetermined number of positions. The viewer is capable of finding the related information more easily by viewing one of the predetermined number of positions. Furthermore, by excluding, from the candidates, the positions on the display unit and not easily viewed by the viewer (for example, edge portions on the display unit), the positions at which related information may be displayed can be limited to positions which are easily found and viewed by the viewer. This further facilitates obtainment of information about an object in video.

Furthermore, candidates for display positions, on the display unit of the information display device, of related information about the object displayed on the video display device are narrowed down to a predetermined number of positions. In addition, for each region on the display screen (display screen region) of the video display device, a different region on the information display device where related information about an object displayed in the display screen region is to be determined is determined. This allows the viewer to know the display screen region of the object on the video display screen, so that the viewer is capable of finding the related information more easily by viewing the corresponding region on the display unit. This further facilitates obtainment of information about an object in video.

Furthermore, the information display device displays related information about an object currently displayed on the video display screen in coordination with a change in display on the video display screen. This further facilitates obtainment of information about an object in video.

Furthermore, the pattern of the display screen regions on the video display device is changed according to a video scene displayed on the video display device. Along with the change, the pattern of the regions on the display unit of the information display device is also changed so that the viewer can easily obtain related information. For example, for a video scene that includes intensive motion, reduced number of display screen regions facilitates the viewer's obtainment of related information. This further facilitates obtainment of information about an object in video.

When the display area of the information display device is limited, it is possible to display newer information among plural related information items. As a result, it is possible to easily obtain newer information about an object in video.

Furthermore, the relative position of an object on the video display device is equivalent to the relative position of related information on the display unit of the information display device. The viewer is capable of finding related information about an object by referring to the position, on the display unit of the information display device, which corresponds to the relative position of the object on the display screen of the video display device. As a result, it is possible to easily obtain information about an object in video.

Moreover, when an objet is being displayed on the video display device, information related to the object can be displayed in real time.

Furthermore, the viewer can obtain at least one of a title, detailed information, or a representative image, as the related information about the object.

Furthermore, the viewer can obtain, from the information display device, related information about objects in the display screen regions obtained by dividing the display screen of the video display device into four.

In other words, the information display device 170 according to Embodiment 1 displays information at an appropriate position on the display unit 309 based on information about "display position" included in the related information received from the distribution server 160. Here, the related information display control unit 307 makes the "display position" information included in the related information correspond to one of the display regions obtained by dividing the display unit 309 into a predetermined number of regions. Accordingly, the related information display control unit 307 is capable of appropriately displaying the related information on the display unit 309. As a result, when a viewer views, on the information display device 170, information about an object that appears in video on the video display device 120 while viewing the video display device 120, the viewer is capable of finding target information from the display screen on the display unit 309 more quickly.

Embodiment 2

In Embodiment 2, a description is given of an example of related information which indicates movement of the display position.

Figure 13:
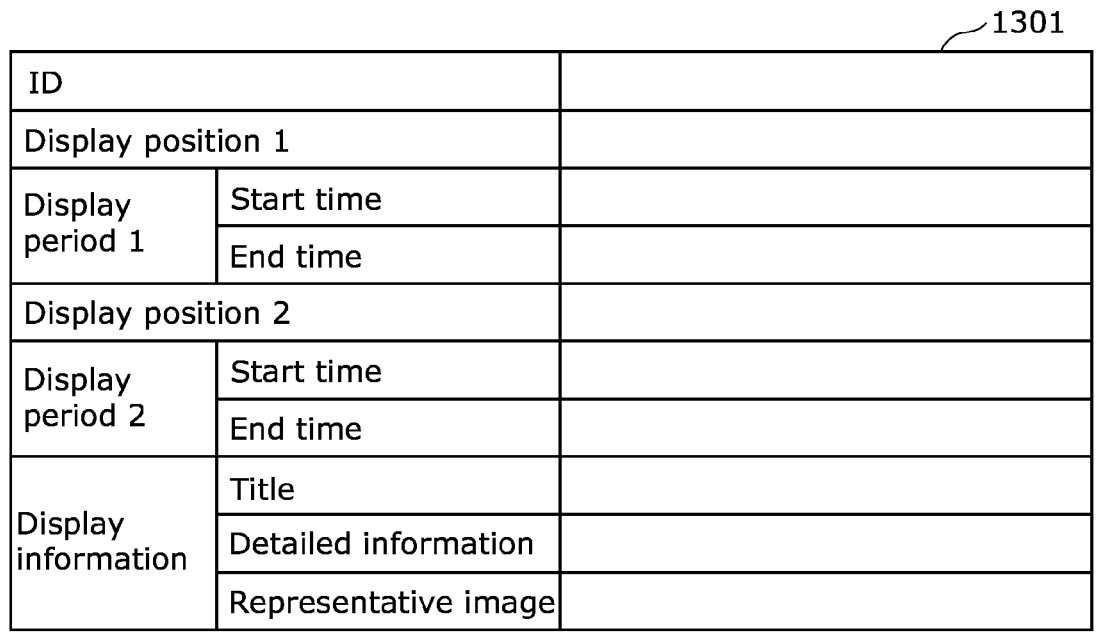
FIG. 13 illustrates an example of related information according to Embodiment 2.

Referring to FIG. 13, a description is given of Embodiment 2. In Embodiment 2, points different from Embodiment 1 are mainly described. Descriptions of the other points are omitted since they are common to Embodiment 1.

[2-1. Configuration]

Embodiment 2 is different from Embodiment 1 in the structure of related information. FIG. 13 illustrates an example of related information used in Embodiment 2.

FIG. 13 illustrates an example of related information (related information 1301) according to Embodiment 2. The related information 1301 illustrated in FIG. 13 is different from the related information 501 according to Embodiment 1 in display position and display period. The related information 1301 according to Embodiment 2 includes a set of a display position 1 and a display period 1 and a set of a display position 2 and a display period 2.

[2-2. Operation]

As illustrated in the process from (b2) (or (c2)) to (d2) in FIG. 12, the related information display control unit 307 uses the related information 1301 illustrated in FIG. 13 when related information display control unit 307 moves related information 501A on the display unit 309 in coordination with the movement of the person A. More specifically, relative to the display content corresponding to (b2) in FIG. 12, its information (display position and display period) is set to the display position 1 and the display period 1 in the related information 1301. Furthermore, relative to the display content corresponding to (d2) in FIG. 12, its information is set to the display position 2 and the display period 2 in the related information 1301. Accordingly, the related information display control unit 307 can know the movement of display (change in display region) from one related information item.

Although a description has been given of the example where one movement was made as in from (b2) (or (c2)) to (d2) in FIG. 12, Embodiment 2 is not limited to the example. Related information may include movements made multiple times. In this case, the number of sets, such as a set of the display position 1 and the display period 1, a set of the display position 2 and the display period 2, and a display position n and a display period n, may be increased.

[2-3. Effects]

As described above, related information may include information about a change (movement) in display position of information to be displayed. In this case, based on such information, the related information display control unit 307 appropriately assigns the display position of information to be displayed to a predetermined display region on the display unit 309 according to the display period (display time), so that information which changes the display position can also be displayed in such a manner that the user can easily view the information.

Embodiment 3

In Embodiment 3, a description is given of an example where a display position is adjusted according to a type of related information.

Figure 14:
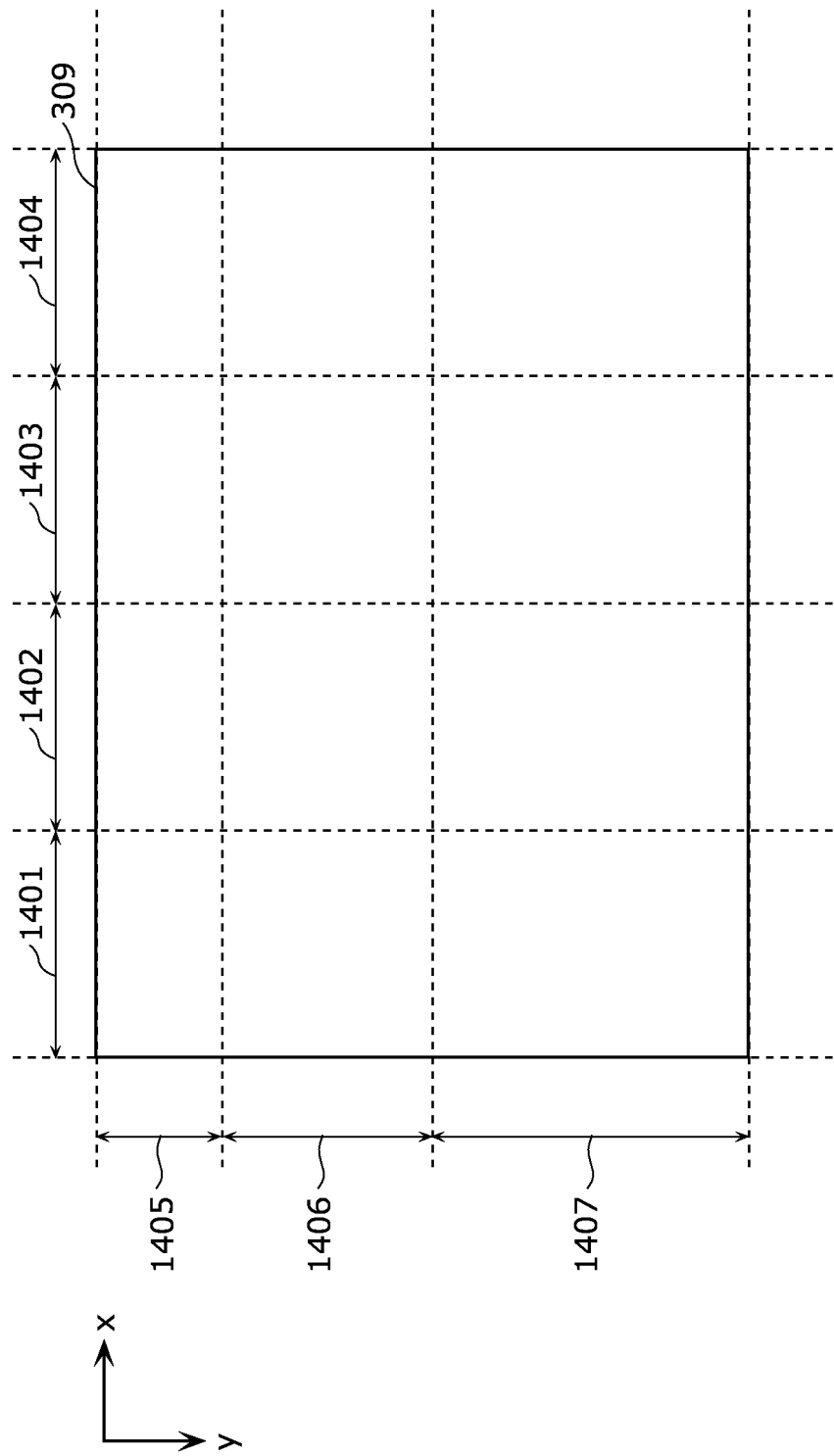
FIG. 14 illustrates an example of division of a display region on an information display device according to Embodiment 3.

Referring to FIG. 14, a description is given of Embodiment 3. In Embodiment 3, points different from Embodiment 1 are mainly described. Descriptions of the other points are omitted since they are common to Embodiment 1.

[3-1. Configuration]

Embodiment 3 is different from Embodiment 1 in that a display screen on the display unit 309 is divided in advance in Embodiment 3.

Specifically, Embodiment 3 is different from Embodiment 1 in the processing performed by the related information display control unit 307.

[3-2. Operation]

In Embodiment 3, the display unit 309 is divided as illustrated in FIG. 14. More specifically, the display unit 309 is vertically divided into four. The four regions are referred to, from left, as a first region 1401, a second region 1402, a third region 1403, and a four region 1404. In addition, each of the first to fourth regions (1401 to 1404) is horizontally divided into three that are referred to, from top, as a title region 1405, a detail region 1406, and an image region 1407. Here, the regions divided horizontally are referred to as the title, detail, and image, but any type (kind) of information may be displayed in the regions.

The related information display control unit 307 determines one of the first to fourth regions related information to be displayed corresponds to, based on the "display position" information in the related information. The determination may be made based on the coordinate of x-axis in the "display position" information.

After determining one of the first to fourth regions in which the related information is to be displayed, the related information display control unit 307 displays, based on the "title", "detail information", and "image information" (FIG. 5) in the "display information" in the related information, respective information in the title region 1405, the detail region 1406, and the image region 1407 in the determined region.

In other words, after determining the display position of the related information based on the information about the "display position" in the related information, the related information display control unit 307 adjusts the display position according to the type of the related information. Specifically, such an adjustment is made by, after determining the display position, adding a relative position determined according to the type of related information to the determined display position.

Accordingly, on a display screen, various information items for the same object are arranged in the vertical direction, and information items of the same type (for example, title) are arranged in the horizontal direction. With such an arrangement on the display screen the user of the information display device 170 can easily view information. Furthermore, arrangement of the same type of information in the horizontal direction allows every user who looks for information of interest differently to searching for information easily, such as a user who mainly searches "title" for information, or a user who mainly searching "image" for information.

[3-3. Effects]

As described above, the information display device according to Embodiment 3 changes the position of related information displayed on the display unit according to the type of information, such as a title of an object or detailed information about the object, so that the display position of related information can be adjusted according to the type of information. For example, a title can be displayed at the upper portion of the display of the related information. With this, when looking for related information about an object, the viewer is capable of obtaining information about the object more easily by viewing the position, on the display unit, determined according to the type of information. For example, in order to find related information from the title of the object, the viewer is capable of easily finding the related information by viewing the upper portion of the display unit. This further facilitates obtainment of information about an object in video.

More specifically, the related information display control unit 307 can provide more easily viewable display of information by dividing the display region of the display unit 309 based on not only the display position, but also type of information to be displayed. In this case, too, the display position of information in the horizontal direction is determined appropriately based on the position of an object in video on the video display device 120 or the like; and thus, the video on the video display device 120 is associated with the display position of information displayed on the information display device 170. As a result, it is possible to provide more user-friendly display of information.

Other Embodiments

The embodiments 1 to 3 have been described above as illustration of a technique disclosed in the present disclosure. However, the technique according to the present disclosure is not limited thereto and is applicable to embodiments to which modifications, permutations, additions, and omissions are made in the scope of the appended claims and the equivalents thereof. Moreover, the structural elements described in the above Embodiments 1 to 3 may be combined into a new embodiment.

The descriptions have been given in Embodiments 1 to 3 where the present disclosure is achieved by the information display device 170; but the present disclosure is not limited thereto. For example, the present disclosure may be achieved as a software program or the like executed by an arithmetic device, using a hardware of the information display device 170.

Furthermore, in Embodiments 1 to 3, the present disclosure may be achieved as not only as the information display device 170, but also as an information display system 100 including the information display device 170 and the video display device 120.

Furthermore, in Embodiments 1 to 3, the descriptions have been given of an example where the display region of the display unit 309 is divided into four for display of information, but the present disclosure is not limited to the example. The display region may be divided into more than four, for example, eight, or may be divided into two or three. The number of divided regions may be determined based on the size of the display unit 309 of the information display device 170. Dividing a large display screen of the display unit 309 into eight, sixteen or the like would allow each information item to be displayed at an appropriate size. However, dividing a relatively small display screen of the display unit 309 into eight, sixteen, or the like may result in such a small-size display of information in the divided regions that a user can hardly view the information in practical use. Hence, the display region of the display unit may be divided into the practically usable number of regions.

Furthermore, in Embodiments 1 to 3, when plural information items are to be displayed at the same display time in the same display region, one of the information items may be selected for display. Furthermore, when no information is to be displayed in a region neighboring the determined display region, information to be displayed in the determined display region may be displayed in the neighboring region instead. When plural information items are to be displayed, a larger number of information items can be displayed by using neighboring regions. In addition, since information is displayed in or near the determined display region, the relative display position in the entire display screen on the display unit 309 is maintained, thereby allowing a user to look for information that the user wants more easily.

Furthermore, in Embodiments 1 to 3, the descriptions have been given of the case where a microphone is used to obtain audio of a video program to identify the video program currently displayed on the video display device. The present disclosure is not limited to the example. As a method other than the above, information for identifying the currently displayed video program may be directly obtained by communicating with the video display device. Use of audio to identify a program allows the information display device according to the present disclosure to be used for a prevalent TV (video display device) which does not have a communication device. Furthermore, a program can be identified more reliably by, for example, communicating with the video display device to obtaining information directly.

Figure 15:
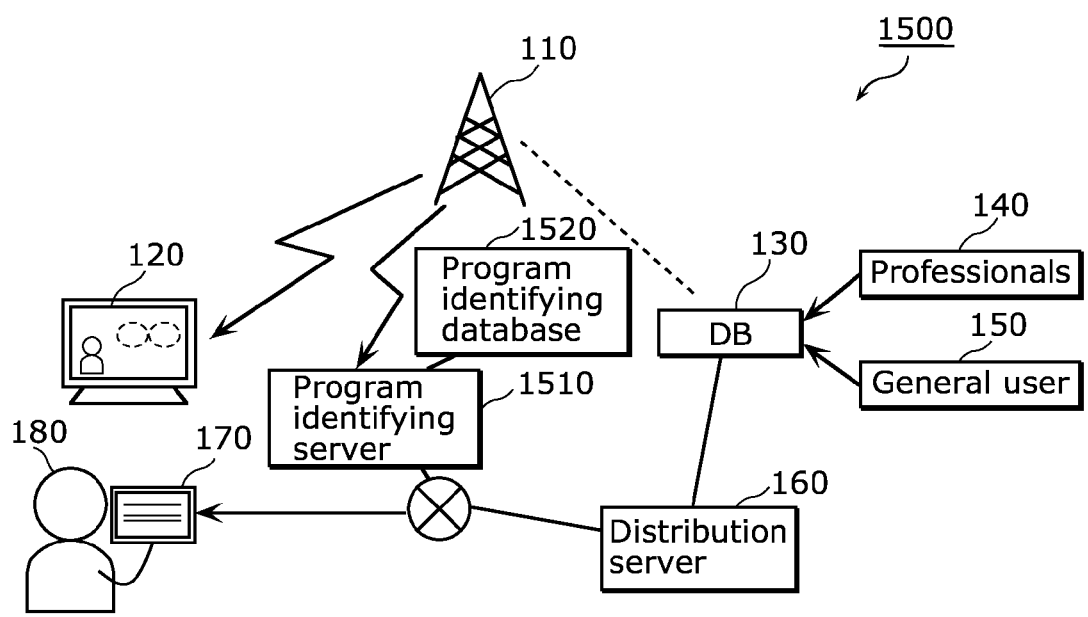
FIG. 15 illustrates an example of a configuration of an information system according to another embodiment.

In Embodiments 1 to 3, the descriptions have been given of the case where audio specific identification information is transmitted to the distribution server 160, and in response, information about the video program corresponding to the audio (program identifying information) is obtained (FIG. 1), but the present disclosure is not limited thereto. Other than the above, as illustrated in FIG. 15, it may be that audio specific identification information is transmitted to another server (a program identifying server 1510) which identifies a program based on audio specific identification information, and information about the video program corresponding to the audio (program identifying information) is obtained. In this case, the distribution server 160 is only necessary to distribute information about a video program, which leads to server load balancing.

The embodiments 1 to 3 have been described above as illustration of a technique disclosed in the present disclosure. To this extent, the accompanying drawings and detailed descriptions have been provided.

Thus, the structural elements set forth in the accompanying drawings and detailed descriptions include not only structural elements essential for solving the problems but also structural elements unnecessary for solving the problems for illustrating the above embodiments. Thus, those unnecessary structural elements should not be acknowledged essential due to the mere fact that the unnecessary structural elements are described in the accompanying drawings and the detailed descriptions.

The above embodiments illustrate the technology according to the present disclosure, and thus various modifications, permutations, additions and omissions are possible in the scope of the appended claims and the equivalents thereof.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The information display device according to the present disclosure is usable as a terminal carried by a viewer with a video display device such as a TV. More specifically, the information display device according to the present disclosure is achievable by a mobile terminal, such as a smart phone, carried by a viewer while the viewer is watching TV.

The invention claimed is:

1. An information display device comprising:
a related information obtaining unit configured to obtain related information including (i) positional information indicating a first position of an object on a video display screen of a video display device and (ii) object information indicating attribute information of the object, the object being currently displayed on the video display screen, the video display device being external to the information display device, said information display device and said video display device having separate operating systems;
a display unit configured to display the object information included in the related information obtained by the related information obtaining unit; and
a display control unit configured to control the display unit so that the object information is displayed at a second position on the display unit in coordination with a display of the object on the video display screen, the second position on the display unit corresponding to the first position on the video display screen, and indicated by the positional information included in the related information the video display device receives video programs distributed from a broadcast station, and the information display device receives the related information from a distribution server.

2. The information display device according to claim 1, wherein the display control unit is configured to control the display unit so that the object information is displayed at the second position included in a plurality of positions on the display unit and corresponding to the first position, each of the positions on the display unit corresponding to a different one of a plurality of positions on the video display screen.

3. The information display device according to claim 1, wherein the related information obtaining unit is configured to obtain the first position indicating a display screen region where the object is currently displayed among a plurality of display screen regions on the video display screen, and
the display control unit is configured to control the display unit so that the object information is displayed at the second position in a region included in a plurality of regions on the display unit and corresponding to the first position, each of the regions on the display unit corresponding to a different one of the display screen regions.

4. The information display device according to claim 1, wherein the display control unit is configured to control the display unit so that the object information is displayed at a new second position obtained by adding, to the second position, a relative position determined for a type of the object information included in the related information obtained by the related information obtaining unit.

5. The information display device according to claim 1, wherein, when the display of the object on the video display screen starts or moves, the related information obtaining unit is configured to obtain the related information including the first position that is after the start or the move, and
the display control unit is configured to control the display unit so that a display of the object information starts at the second position or moves to the second position on the display unit in coordination with the start or the move of the display of the object on the video display screen, the second position corresponding to the first position that is after the start or the move.

6. The information display device according to claim 3, wherein the related information obtaining unit is configured to obtain (i) a region pattern determined according to a video scene displayed on the video display device and (ii) the first position indicating a display screen region where the object is currently displayed among the display screen regions determined according to the region pattern, and
the display control unit is configured to control the display unit so that the object information is displayed at the second position in a region corresponding to the first position, the region being included in a plurality of regions set for the display unit according to the region pattern.

7. The information display device according to claim 1, wherein, when the display control unit controls the display unit so that a plurality of the object information items are displayed at the same second position, the display control unit is configured to control the display unit so that most recently generated object information among the object information items is displayed.

8. The information display device according to claim 1, wherein the display control unit is configured to control the display unit so that the object information is displayed at the second position on the display unit, the second position having a relative position on the display unit that is equal to a relative position of the first position on the video display screen.

9. The information display device according to claim 1, wherein the related information obtaining unit is further configured to obtain a display period indicating a period during which the object is displayed on the video display screen, and
the display control unit is configured to: determine whether or not a current time is within the display period obtained by the related information obtaining unit; and when the display control unit determines that the current time is within the display period, control the display unit so that the object information is displayed at the second position on the display unit.

10. The information display device according to claim 1, wherein the related information obtaining unit is configured to obtain, as the object information, the related information including at least one of a title, detailed information, and a representative image of the object.

11. The information display device according to claim 3, wherein a total number of the display screen regions is four, and
a total number of the regions determined for the display unit is four.

12. An information display method performed by an information display device including a display unit, the information display method comprising:
obtaining related information including (i) positional information indicating a first position of an object on a video display screen of a video display device and (ii) object information indicating attribute information of the object, the object being currently displayed on the video display screen, the video display device being external to the information display device, said information display device and said video display device having separate operating systems;
displaying, on the display unit, the object information included in the related information obtained in the obtaining; and
controlling the display unit so that the object information is displayed at a second position on the display unit in coordination with a display of the object on the video display screen, the second position on the display unit corresponding to the first position on the video display screen, and indicated by the positional information included in the related information the video display device receives video programs distributed from a broadcast station, and the information display device receives the related information from a distribution server.

13. A non-transitory computer-readable recording medium for use in a computer, said recording medium having a computer program recorded thereon for causing the computer to execute the information display method according to claim 12.

14. An information display system comprising:
the information display device according to claim 1;
the video display device including a video display screen on which video is displayed; and
the distribution server which distributes the related information to the information display device.

15. The information display device according to claim 1, wherein the video display device is a television, and the information display device is a smart phone.

16. The information display method according to claim 12, wherein the video display device is a television, and the information display device is a smart phone.

* * * * *